United States Patent Office 3,202,120
Patented Aug. 24, 1965

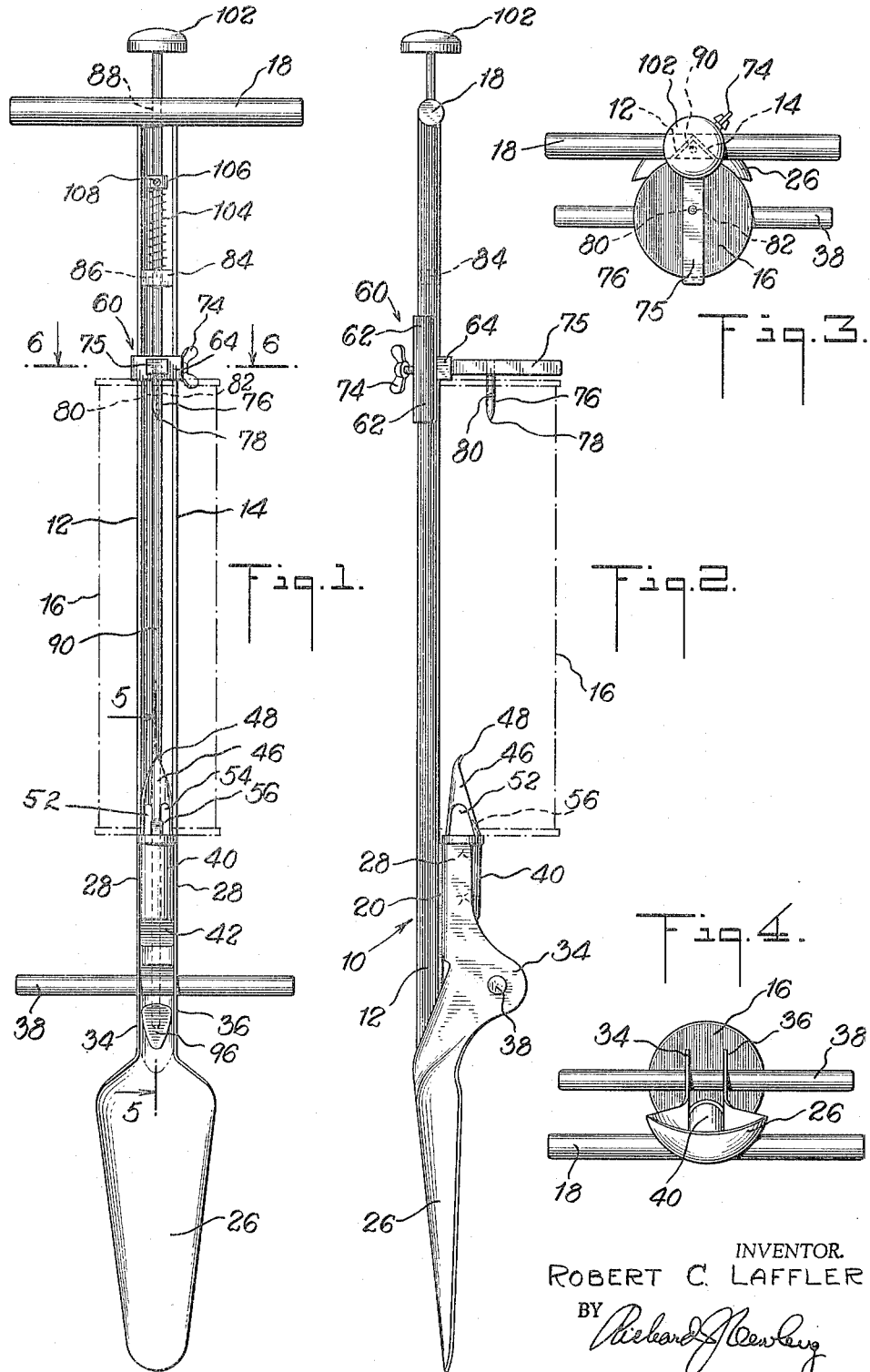

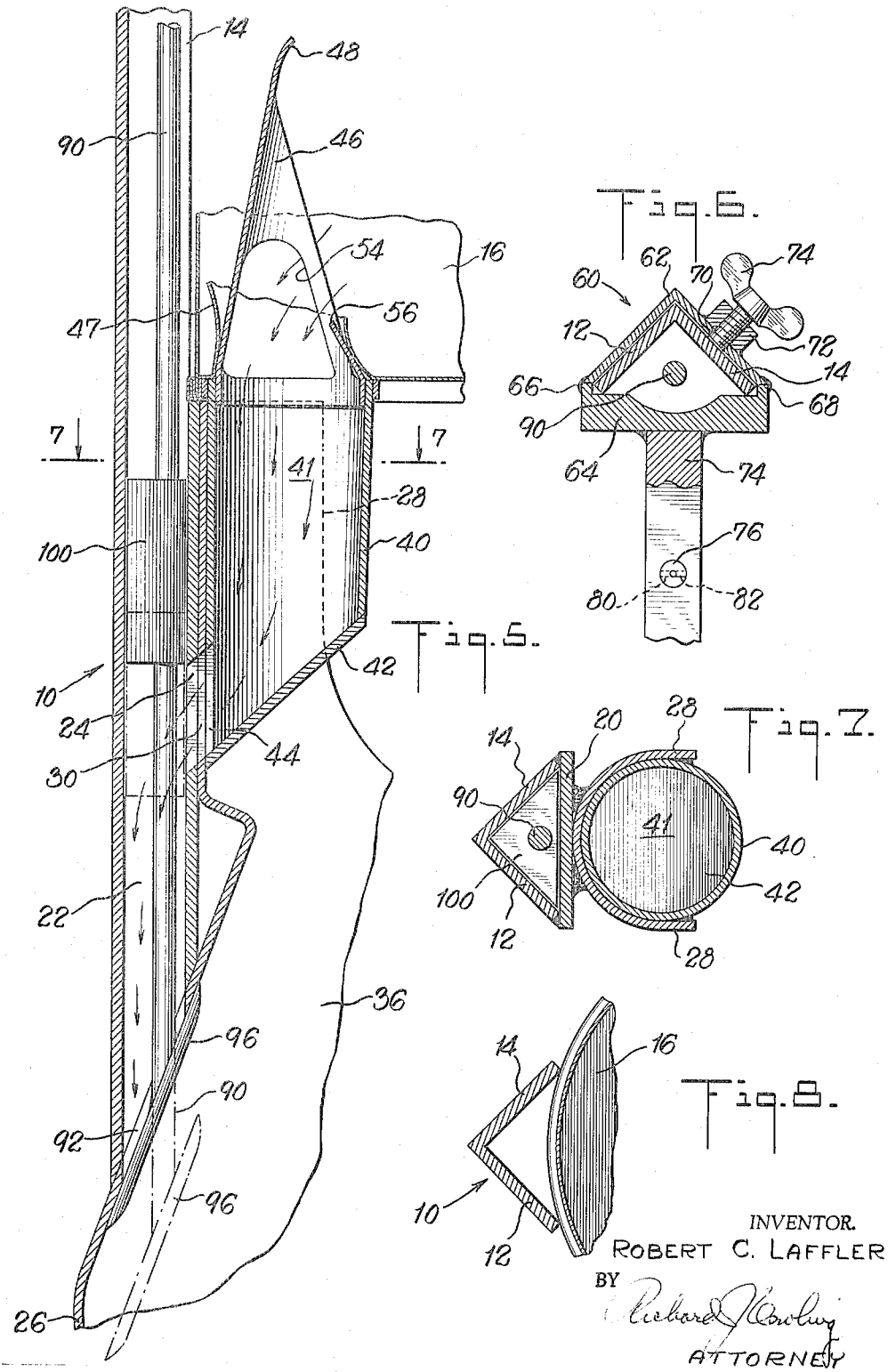

3,202,120
FERTILIZER DISTRIBUTING TOOL WITH
REPLACEABLE CARTRIDGE
Robert C. Laffler, 237 Bradley Ave., Bergenfield, N.J.
Filed Nov. 19, 1963, Ser. No. 324,683
3 Claims. (Cl. 111—96)

The present invention relates generally to a fertilizer distributing tool, and it has particular relation to a tool of the type that will receive and perforate a replaceable throw-away factory filled cartridge of granular fertilizer, and distribute the contents thereof in measured quantities as desired for the deep root feeding of all kinds of flowers, plants, shrubbery and/or trees.

The present invention is an improvement over a number of similar tools having a built-in supply hopper from which measured quantities of fertilizer may be distributed. A built-in supply hopper not only greatly adds to the cost of the tool but greatly increases its weight, making it difficult for persons of slight strength and build to manipulate. Such prior art tools have never become popular because of the problems involved in overcoming corrosion of the operating mechanism since the reciprocating mechanism operated within the supply hopper and fertilizer was gravitationally discharged from a hopper and cascaded directly over and around the measuring valves.

With the present invention all of the aforesaid disadvantages of the prior art fertilizer distributing and measuring tools have been obviated, and there has been provided a tool that not only uses a replaceable cartridge, eliminating the expensive and heavy built-in supply hopper, but also a tool in which the reciprocating mechanism does not operate through the supply hopper and the measuring valves operate outside of the measuring chamber, thereby avoiding the normal tendency to corrode from corrosive action of the fertilizer.

An object of the invention is the provision of a simple, inexpensive, efficient and light-in-weight fertilizing tool that is durable in construction and capable of distributing granular fertilizer directly from factory-filled cartridges of the type that can be thrown away and easily and quickly replaced by the operator without the necessity of using tools of any kind.

Another object of the invention is to provide a simple, inexpensive and efficient fertilizer measuring and distributing tool that is capable of receiving, perforating and discharging measured quantities of fertilizer from a factory-filled throw-away cartridge.

A further object of the invention is the provision of simple, inexpensive and efficient means for securing a replaceable fertilizer cartridge on the tool, puncturing its bottom to permit the flow of its contents therefrom and then measuring and distributing said contents as desired.

Another object of the invention is the provision of simple, inexpensive and efficient means for suitably securing a replaceable fertilizer cartridge on the tool and preventing the formation of a vacuum within the cartridge while the contents is being discharged therefrom.

A further object of the invention is to provide a new and improved arrangement for the spaced measuring valves, whereby the gravitationally discharged of the granular fertilizer material will not be cascaded over and around said valves, causing excessive corrosion of the operating mechanism.

Another object of the invention is the provision of a novel penetrating blade or spade that forms an arcuate slit in the ground instead of a round or square hole, the latter compacting said grounds and offering greatly increased resistance to the final penetration of the fertilizer into the root zone being treated.

A further object of the invention is to provide penetrating slits in the ground surrounding the flower, plant, shrubbery and/or tree to be fertilized, without compacting the ground excessively, and to disperse the granular fertilizer being discharged from the tool over a greater area, thereby contacting more roots and permitting the use of stronger, higher-powered, fertilizers without danger of burning.

Another object of the invention is the provision of a hand tool for distributing granular fertilizer from a factory-filled cartridge having a handle bar that makes stooping unnecessary for easy insertion of the same into the ground in combination with a foot bar that facilitates insertion in ground too hard for manual manipulation, and spring-urging means mounted on the top of said tool for controlling the discharge of measured quantities of fertilizer from said factory-filled cartridge.

Another object of the invention is the provision of a hand tool for distributing granular fertilizer from factory filled cartridges which has adjustable means for receiving and holding cartridges of different sizes and lengths.

Other and further objects and advantages of the invention, which result in simplicity, economy and efficiency, will be apparent from the following detailed description, reference being had to the accompanying drawings, forming a part hereof, wherein like numerals indicate like parts, in which:

FIGURE 1 is a front elevational view of a fertilizer measuring and distributing tool made in accordance with the principles of the invention;

FIGURE 2 is a side elevational view of the tool shown in FIGURE 1;

FIGURE 3 is a top plan view of the tool shown in FIGURE 1;

FIGURE 4 is a bottom plan view of the tool shown in FIGURE 1;

FIGURE 5 is a fragmentary vertical sectional view, on an enlarged scale, of the feed and discharge mechanisms of the tool shown in FIGURE 1, the same having been taken substantially along the line 5—5 thereof, looking in the direction of the arrows;

FIGURE 6 is a horizontal sectional view, on an enlarged scale, showing the top fastening means for the adjustable carriage for securing replaceable cartridges in the tool, the same having been taken substantially along the line 6—6 of FIGURE 1, looking in the direction of the arrows;

FIGURE 7 is a horizontal sectional view of the feed and discharge mechanism, the same having been taken substantially along the line 7—7 of FIGURE 5, looking in the direction of the arrows; and FIGURE 8 is a fragmentary horizontal sectional view through the center of the tool, illustrating the nesting and/or centering of the factory filled replaceable cartridge on the spaced side edges of the main longitudinal frame thereof.

Referring now to the drawings, and particularly FIGURES 1 and 2, there is shown a fertilizing tool embodying the present invention, comprising a longitudinally extending main frame member 10, which is semi-tubular in cross-section and is provided with two forwardly projecting spaced side edges 12 and 14 in the same transverse plane, permitting centering of the factory-filled fertilizer cartridge 16 along the longitudinal axis of the frame member 10. In the tool that is illustrated in the drawings, the trough-like construction of the main longitudinal frame member 10 is shown to be substantially V-shape in cross-section. It is obvious that the trough-like frame member 10 may be of any other suitable shape that will provide the necessary spaced side edges or rails 12 and 14 for mounting and centering the replacement cartridge 16 thereon, as for example, semi-circular, semi-square or semi-rectangular.

The overall length of the main frame member 10 is preferably that which will permit convenient use by a person of average height while standing in substantially an upright position.

The lower end of the main longitudinally extending frame member 10 has its front open side closed by a metal plate 20 welded or otherwise permanently secured to the side edges 12 and 14 to form a closed measuring chamber 22 as best shown in FIGURE 5. The plate 20 is provided with a longitudinally extending slot 24 that serves as the entrance to the measuring chamber 22.

An earth working blade or spade 26 is welded onto the lower end of the main frame member 10 directly over the plate 20. The blade 26 is slightly arcuate and has a substantial length as compared to its width dimensions for easy insertion into the ground. The upper end of the blade 26 narrows, forming an open top integral collar 28, which is substantially semicircular in cross-section. The collar portion 28 of the blade 26 is welded to the top side of the plate 20, and has an elongated slot 30 therethrough. The slot 30 in the collar 28 of the blade 26 corresponds in size and shape with the slot 24 in the plate 20 of the main frame member 10, and is in alignment therewith to form a communicating passageway through the plate 20 and collar 28, respectively. The forwardly extending sides of the open top integral collar 28 are provided with outwardly extending enlarged bosses 34 and 36 for receiving and mounting a transversely extending foot bar 38, which can be used to assist in the insertion of the blade 26 into hard, dry earth that cannot be easily penetrated with hand pressure alone applied to the handle bar 18.

Mounted within the forwardly extending sides of the collar 28 and above the bosses 34 and 36 is a tubular open top intermediate receiving hopper 40. The hopper 40 is soldered or spot-welded between the sides of the open collar 28, and has an inwardly sloping closed bottom 42, whose lower edge is soldered or welded to the collar 28 contiguous to the lower edge of the slot 30 thereof. The receiving chamber 41 in the hopper 40 has a slot 44 in its inner sidewall adjacent to its sloping bottom 42, which slot 44 corresponds in size and shape and is aligned with the slot 30 in the collar 28. Thus, the aligned slots 24, 30 and 44 provide a discharge passageway for the fertilizer to flow gravitationally from the receiving chamber 40 into the measuring chamber 22.

The open top of the receiving chamber 40 is provided with a semi-circular upwardly extending peripheral flange 46 forming a conduit whose upper edges converge upwardly into a sharp point 48, which is capable, under pressure, of penetrating and/or puncturing the cardboard bottom of the replaceable cartridge 16. The sides of the conduit flange 46 adjacent the top of the receiving hopper 40 are provided with diametrically spaced openings 52 and 54, which facilitates the gravity flow of the granular fertilizer from the factory-filled punctured cartridge 16 into the receiving chamber 41 of the hopper 40. An upwardly and inwardly projecting tab 56 extends from the top of the chamber 40 between the sides of the flange 46, and serves to hold the hinged flexible cardboard tab 47, which is formed from puncturing its bottom with the point 48 and arcuate edges of the conduit flange 46, from being forced downwardly by the gravity flow of fertilizer from the cartridge 16 into its original closed position, thereby sealing-off or partially closing-off the newly made opening in the bottom thereof.

There is mounted on the main frame member 10 between the top of the receiving hopper 40 and the handle bar 18, a slidable carriage member 60, which is best illustrated in FIGURES 1, 2 and 6. The carriage member 60 has an angular base 62 that conforms to the shape of the main frame member 10. A cross-strap 64 is welded to the forwardly extending side edges 66 and 68 of the base member 62, and bridges the open front side of the main frame member 10. The base member 62 has an internally threaded aperture 70 therethrough on one side thereof. An internally threaded sleeve or nut 72 is welded to the base member 62 with its threaded opening in axial alignment with the aperture 70. A wing bolt 74 is adapted to be threaded into said nut 72 and through said aperture 70 until the end of its projecting shank engages the side 14 of the frame member 10. Obviously, the carriage member 60 may be mounted slidably in different fixed positions on the frame member 10 between the intermediate supply hopper 40 and handle bar 18, thereby making it possible to use cartridges of different sizes and lengths.

A bar 75 extends forwardly from the median axis of the cross-strap 64 of the carriage member 60 to which it has been welded. The bar 75 has a hollow tubular rod 76 (see FIGURE 2) depending intermediate its ends. The rod 76 is open at the top and closed at the bottom into a needle-like point 78. The point 78 provides a penetrating member for piercing the closed top end of the factory-filled fertilizer cartridge 16. It will be noted that the rod 76 has two diametrically spaced openings 80 and 82 in the sidewall thereof, immediately above the tapered, closed and pointed end 78, which openings 80 and 82 are in open communication through its axial hollow with the open top of the rod 76. Such an air passageway prevents the formation of a vacuum in the emptying cartridge 16 while the tool 10 is being used to dispense fertilizer therefrom.

The main frame member 10 adjacent its upper end and spaced from the handle bar 18 has a cross-bar 84 welded within its open front side. The cross-bar 82 has an axial aperture 86, which is in longitudinal alignment with a corresponding aperture 88 extending through the handle bar 18. Through the aligned apertures 86 and 88 is mounted slidably a rod 90, which is of considerable length. The upper end of the rod 90 projects through and above the handle bar 18 while its lower end extends to the lower end of the main frame member 10, as best shown in FIGURE 5.

The lower end of the main frame member 10 extends into and through a slot 92 in the base of the open top collar 28 of the blade 26, and is securely welded with its lower edge contiguous to and in alignment with the surface of the collar 28. The lower end of the rod 90 extends through the slot 92 in the base of the blade 26, has its end surface cut at an acute angle corresponding to the angle of the blade 26. A plate 96, which is substantially elliptical in shape and of a size slightly larger than the slot 92 in the blade 26 is welded to the bottom of the rod 90, forming a closure valve for closing off the slot 92 by completely covering the same.

A triangularly shaped valve member 100 in the form of a slidable plug is mounted fixedly on the rod 90 a short distance above the valve plate 96, said short distance being equal to the distance between centers of the spaced slots 24 and 92. The slidable plug valve 100 is slightly longer and wider than the slot 24 so that it will entirely block off the same when the rod 90 is moved downwardly to open the valve plate 96.

The top end of the rod 90 is threaded for receiving an internally threaded and removable conventional knob 102.

The assembly

When it is desired to mount the rod 90 within the main frame member 10, the top threaded end thereof is first inserted through the opening 92, leading from the blade 26 into the measuring chamber 24. The rod 90 is then pushed upwardly of the main frame member 10 through the aperture 86 in the cross-bar 84. A coil spring 104 is mounted concentrically over the upper end of the rod 90, which now extends above the cross-bar 84. The coil spring 104 has an integral top collar 106 that is provided with a transversely extending threaded aperture for receiving a set screw 108. After the spring 102 has been mounted concentrically over the end of the rod 90, the rod 90 is again moved upwardly through the aligned opening 88 in the handle bar 18. The rod 90 must be pushed upwardly until its attached valve plate 96 closes and covers the discharge slot 92. In this position, the top end of the rod 90 will project upwardly several inches beyond the handle bar 18. The end knob 102 may now be threaded thereon. With the valve plate 96 held tightly over the slot 92 in the blade 26, the coil spring 104 on the rod 90 may now be compressed against the top of the cross-bar 84, and, while under such compression, a set screw 108 in the collar 106 may be tightened to secure the spring 104 on the rod 90 under compression. Now, when pressure is exerted on the knob 102, the rod 90 will be moved against the coil spring 104, further increasing its spring urging means. At the same time, the upper triangular plug valve 100 will be moved downwardly to close off the slot 24, preventing further gravitational flow of granular fertilizer from the receiving chamber 41 into the measuring chamber 24. Manifestly, when the slot 24 is closed off, the receiving chamber 41 will become filled by the gravitational flow of fertilizer from the factory-filled cartridge 16, and, when so filled, no more fertilizer can gravitate from said cartridge 16. Simultaneously, the valve plate 96, which covers the slot 92 through the top of the blade 26 will be moved downwardly and away therefrom, permitting the gravitational discharge of fertilizer from the measuring chamber 22 through the slot 92 into the ground. Obviously, when pressure is again released on the knob 102, the coil spring 104 will urge the rod 90 upwardly, thereby carrying or moving the slidable plug valve 100 above the slot 24, opening the same to permit the flow of new fertilizer granules from the receiving chamber 41, and, at the same time, the lower end of the rod 90 will move its valve plate 96 over the slot 92, closing off the same to prevent any further gravitational discharge of fertilizer from the tool into the ground. Thus, each time the knob 102 is manually depressed, a measured quantity of fertilizer will gravitate through the blade 26. However, holding the knog 102 in either its extended or depressed position will not permit a continuous discharge of fertilizer onto the ground. Only a measured quantity that which can be held by the measuring chamber 22 will be discharged on any one depression of the knob 102.

*The operation*

In the operation of the tool for the deep feeding of plants, flowers, shrubs and/or trees, the operator first mounts the factory-filled cardboard cartridge 16, containing granular fertilizer, on the main frame member 10 by centering it on the spaced side edges 12 and 14 thereof, as best illustrated in FIGURE 8. The operator next pushes the cartridge 16 towards the open top of the intermediate supply hopper 40 until the upwardly projecting pointed end 48 and conduit sides 46 puncture the closed bottom thereof. The slidable carriage member 60 may now be loosened by the wing bolt 74 and moved into contact with the closed top of the cartridge 16 until the point 78 of the hollow tubular rod 76 pierces and enters the top of said cartridge 16. The carriage member 60 may now be secured fixedly to the main frame member 10 by tightening the wing bolt 74, which fastens the cartridge 16 securely to the tool 10. The tool 10 is now loaded and ready for use.

The operator, holding the tool 10 by its handle bar 18, thrusts it downwardly into the root zone of the plant, flower, shrub and/or tree to be fertilized. If difficulty is encountered in penetrating the ground of the root zone, the operator may facilitate penetration by putting a foot on the foot bar 38 and pressing downwardly thereon. The operator then draws the handle bar 18 of the tool 10 backwardly towards his body. This action slightly separates the blade 26 from the surrounding earth. With the blade 26 still in the ground, the operator now presses downwardly on the knob 102, which moves the slidable plug valve 100 over the discharge slot 24, leading from the fertilizer receiving chamber 41 into the measuring chamber 22, and simultaneously moves the valve plate 96 away from the slot 92, thereby permitting the gravitational discharge of granular fertilizer contained in the measuring chamber 22 into the separation of the ground surrounding the blade 26. The blade 26 guides the fall of said granules into the root zone. The amount of fertilizer to be placed in each slit so formed in the earth by the blade 26 is controlled by the number of times the operator pushes downwardly on the knob 102. It will be obvious that holding down the knob 102 will not permit a continuous gravitational flow of fertilizer from the receiving chamber 41 since, as long as the knob 102 is held in its depressed position, the sliding plug valve 100 blocks off the slot 24, leading into the measuring chamber 22. When the valve 100 is moved upwardly above the slot 24 with the spring-urging means 104 functioning upon the release of the knob 102, the valve plate 96 is simultaneously moved upwardly completely closing the bottom slot 92, thereby closing off the gravity flow of fertilizer from the measuring chamber 22 onto the ground. When the cartridge 16 becomes empty, the wing bolt 74 is loosened, the carriage 60 moved upwardly until the point 78 is withdrawn. The empty cartridge 16 may now be removed from the piercing point 48 and flange 46 to be discarded. A new cartridge 16 may be now attached as previously described.

Although I have only described in detail one form which the invention may assume, it will be readily apparent to those skilled in the art that the invention is not to be so limited, but that various modifications may be made therein without departing from the spirit thereof or the scope of the appended claims.

What I claim is:

1. In a portable, hand manipulated, fertilizer tool comprising a longitudinally extending trough-like main frame member having a handle at its upper end and a spade at its lower end, the combination with a replaceable cartridge to be used as a fertilizer supply hopper therefor, an apertured base mounted outside and intermediate the ends of said frame member for supporting the bottom of a cartridge adjacent said trough-like frame member, said base including conduit means for puncturing the bottom of said cartridge, means mounted adjustably on said frame member between said base and said handle for engaging the top of said cartridge to secure the same fixedly thereto, a receiving chamber below said base and in open communication with said conduit means for receiving fertilizer gravitating from said cartridge, a measuring chamber below said receiving chamber and within said frame member for receiving the gravitational flow of fertilizer from said receiving chamber, a rod extending within said trough-like frame member from said spade to said handle, a pair of longitudinally spaced valves mounted on said rod, the top valve for closing a passageway between said receiving chamber and said measuring chamber and the bottom valve for closing a discharge outlet within and through said spade, said valves being spaced so that when one valve is in its closed position the other valve will remain in its open position, spring urging means mounted on said rod to cause it to return to its uppermost position, whereby the lower valve will keep the discharge outlet within and through said spade normally closed.

2. The improvement defined in claim 1, including means for holding the hinged cut-out flap formed by said puncturing means from being forced by the gravitational flow of fertilizer downwardly sufficiently to seal-off the flow of fertilizer from said cartridge into said receiving chamber.

3. In a portable, hand manipulated, fertilizer tool comprising a longitudinally extending trough-like main frame member having a handle at its upper end and a spade at its lower end, the combination with a replaceable cartridge to be used as a fertilizer supply hopper therefor, an apertured base mounted intermediate the ends of said frame member for supporting the bottom of a cartridge adjacent said trough-like frame member, means mounted adjustably on said frame member between said base and said handle for engaging the top of said cartridge to secure the same thereto, said means having a depending projection for piercing said top of said cartridge and preventing the formation of a vacuum in said cartridge when said fertilizer is gravitating therefrom, a receiving chamber below said base for receiving fertilizer gravitating from said cartridge, a measuring chamber below said receiving chamber for receiving the gravitational flow of fertilizer from said receiving chamber, a rod extending within said trough-like frame structure from said spade to said handle, a pair of longitudinally spaced valves mounted on said rod, the top valve for closing a passageway between said receiving chamber and said measuring chamber and a bottom valve for closing a discharge outlet within and through said spade, said valves being spaced so that when one valve is in its closed position the other valve will remain in its open position, spring urging means mounted on said rod to cause it to return to its uppermost position, whereby the lower valve will keep the discharge outlet within and through said spade normally closed.

References Cited by the Examiner

UNITED STATES PATENTS

| | | | |
|---|---|---|---|
| 266,184 | 10/82 | Morgan | 111—96 |
| 1,720,601 | 7/29 | Kalenoff | 111—96 |
| 1,998,164 | 4/35 | Moody | 222—83.5 |
| 2,580,755 | 1/52 | Funk | 111—7.4 |
| 2,737,318 | 3/56 | Molinare | 111—96 X |
| 2,951,314 | 9/60 | Laughlin | 111—7.1 |

ABRAHAM G. STONE, *Primary Examiner.*

WILLIAM A. SMITH III, *Examiner.*